(12) United States Patent
Emori (10) Patent No.: US 7,936,795 B2
(45) Date of Patent: May 3, 2011

(54) CASCADE RAMAN LASER

(75) Inventor: Yoshihiro Emori, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/619,277

(22) Filed: Nov. 16, 2009

(65) Prior Publication Data

US 2010/0265971 A1 Oct. 21, 2010

Related U.S. Application Data

(63) Continuation of application No. 12/413,961, filed on Mar. 30, 2009, now abandoned.

(60) Provisional application No. 61/040,995, filed on Mar. 31, 2008.

(51) Int. Cl.
*H01S 3/30* (2006.01)
(52) U.S. Cl. .................................. 372/3; 372/6
(58) Field of Classification Search .............. 372/3, 6
See application file for complete search history.

(56) References Cited

U.S. PATENT DOCUMENTS

| | | | | |
|---|---|---|---|---|
| 5,323,404 | A * | 6/1994 | Grubb | |
| 5,815,518 | A | 9/1998 | Reed et al. | |
| 6,163,552 | A * | 12/2000 | Engelberth et al. | |
| 6,236,498 | B1 * | 5/2001 | Freeman et al. | |
| 6,310,899 | B1 * | 10/2001 | Jacobovitz-Veselka et al. | |
| 6,434,172 | B1 * | 8/2002 | DiGiovanni et al. | |
| 6,549,329 | B2 * | 4/2003 | Vail et al. | |
| 6,606,187 | B1 * | 8/2003 | Islam et al. | |
| 6,621,835 | B1 * | 9/2003 | Fidric | |
| 6,738,180 | B2 | 5/2004 | Hirasawa et al. | |
| 6,836,488 | B2 * | 12/2004 | Bayart et al. | |
| 7,113,524 | B2 * | 9/2006 | Bonaccini et al. | 372/6 |
| 7,136,401 | B2 * | 11/2006 | Leplingard et al. | |
| 2002/0063947 | A1 * | 5/2002 | Islam | |
| 2002/0097483 | A1 * | 7/2002 | Vail et al. | |
| 2004/0240487 | A1 * | 12/2004 | Borne et al. | 372/3 |
| 2005/0078715 | A1 * | 4/2005 | Borne et al. | 372/3 |
| 2005/0152412 | A1 * | 7/2005 | Leplingard et al. | |

OTHER PUBLICATIONS

S.G. Grubb, et al., "High-Power 1.48 μm Cascaded Raman Laser in Germanosilicate Fibers", Optical Amplifiers and their Applications, Paper SaA4, 1995, pp. SaA4-1/197 through SaA4-3/199.

* cited by examiner

*Primary Examiner* — Minsun Harvey
*Assistant Examiner* — Phillip Nguyen
(74) *Attorney, Agent, or Firm* — Oblon, Spivak, McClelland, Maier & Neustadt, L.L.P.

(57) ABSTRACT

The invention provides a cascade Raman laser including a pumping laser light source that generates pumping light, a cascade Raman resonator having an input-side optical reflector that receives the pumping light and selectively reflects light of each wavelength corresponding to a n-th Stokes ray (n is an integer more than 1) of Raman scattering to the pumping light, a Raman optical fiber that is connected to the input-side optical reflector and generates Raman scattering light at least by the pumping light and an output-side optical reflector that is connected to the Raman optical fiber and selectively reflects light of each wavelength corresponding to the n-th Stokes ray and a blocking device interposed between the pumping laser light source and the cascade Raman resonator and blocks the first Stokes ray generated within the cascade Raman resonator from entering the pumping laser light source side.

4 Claims, 6 Drawing Sheets

| Pump condition | Output power [W] | |
|---|---|---|
| | From the back end | From the front end |
| FW4A | 4.1 | 12.5 |
| FW8A | 13.2 | 23.4 |
| BW4A | 2.7 | 11.1 |
| BW8A | 6.1 | 23.8 |
| FW8A BW4A | 20.7 | 34.7 |

CASCADE RAMAN LASER

CROSS-REFERENCE TO RELATED APPLICATIONS

The present application claims the benefit of the earlier filing date of U.S. Provisional Patent Application Ser. No. 61/040,995, filed Mar. 31, 2008, the entire contents of which being incorporated herein by reference.

BACKGROUND OF THE INVENTION

1. Field of the Invention

The present invention relates to a cascade Raman laser.

2. Description of Related Art

Figure 9:
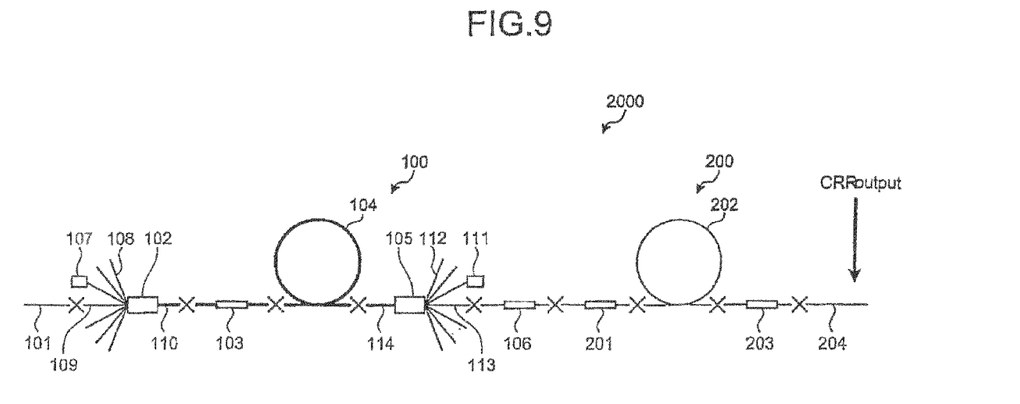
FIG. 9 is a block diagram showing one exemplary structure of a conventional cascade Raman laser.

FIG. 9 is a block diagram showing one exemplary structure of a conventional cascade Raman laser outputting laser light with a wavelength of 1480 nm. (see S. G. Grubb, et al., "High-Power 1.48 µm Cascaded Raman Laser in Germanosilicate Fibers," in Optical Amplifiers and Their Applications (1995), paper SaA4 for example). This cascade Raman laser 2000 has a structure in which a clad pump fiber laser (CPFL) 100 outputting laser light with a wavelength of 1117 nm as pumping light and a cascade Raman resonator (CRR) 200 that generates laser light with the wavelength of 1480 nm by using the laser light with the wavelength of 1117 nm are connected in cascade. It is noted that marks 'x' in the figure indicate fused connecting points. It is also noted that optical fibers represented by thin solid lines have an outer diameter of 125 µm and optical fibers represented by thick solid lines have an outer diameter of 250 µm.

The structure of the cascade Raman laser 2000 will be explained concretely from a back of the CPFL 100. Firstly, the CPFL 100 has a structure in which an extension optical fiber 101, a front pumping TFB (Tapered Fiber Bundle) 102, i.e., a multiplexer for multiplexing the pumping light, a highly reflective fiber Bragg grating (FBG, referred to as HR (High Reflection) hereinafter) 103 having reflectivity of about 100% for the wavelength of 1117 nm, a clad pump fiber (CPF) 104 having a double clad structure and Yb is doped in its core, a back pumping TFB 105 and an outputting fiber Bragg grating (FBG, referred to as an OC (Output Coupler) hereinafter) having reflectivity of about 30 to 60% for the wavelength of 1117 nm are connected in cascade by means of fusion splicing. The front pumping TFB 102 is connected with eighteen semiconductor pumping lasers 107 with a wavelength of 989 nm through eighteen pumping optical fibers 108. The back pumping TFB 105 is connected with eighteen semiconductor pumping lasers 111 through eighteen pumping optical fibers 112.

The CPFL 100 outputs laser light with the wavelength of 1117 nm by an amplifying action of the CPF 104 to which the pumping light is supplied and by an optical resonator composed of the HR 103 and the OC 106.

Meanwhile, the CRR 200 has a structure in which an input-side reflector (referred to as a CRRin hereinafter) 201, a Raman optical fiber 202 for Raman amplification, an output-side reflector (referred to as a CRRout hereinafter) 203 and an outputting optical fiber 204 are connected in cascade by means of fusion splicing.

The CRRin 201 is composed of five FBGs that selectively reflect lights of mutually different wavelengths. Reflection center wavelengths of the respective FBGs are, from an input side, about 1480 nm, 1390 nm, 1310 nm, 1239 nm and 1175 nm. Meanwhile, the CRRout 203 is composed of six FBGs that selectively reflect lights of mutually different wavelengths. Reflection center wavelengths of the respective FBGs are, from an input side, 1480 nm, 1175 nm, 1239 nm, 1310 nm, 1390 nm and 1117 nm. It is noted that reflectivity of the reflection center wavelengths of the respective FBGs of the CRRin 201 and the CRRout 203 is from 5 to 30% for the FBGs whose reflection center wavelength is 1480 nm and is about 100% for the other FGBs. (It is also noted that in order of the reflection center wavelengths of the respective FBGs of CRRin 201 and CRRout 203 is accordance with U.S. Pat. No. 5,815,518 titled "Article comprising a cascaded raman fiber laser" and is set up to get the high-efficiency optical power with the wavelength of 1480 nm within CRR 200. It is able to operate that in order of the FBGs is not same above-mentioned CRR. No matter what the FBGs is in different orders.)

Next, operations of the CRR 200 will be explained. When the laser light with the wavelength of 1117 nm is inputted to the Raman optical fiber 202 from the CPFL 100, Raman scattering light with a wavelength of 1175 nm corresponding to a first Stokes wavelength of Raman scattering (referred to as a first Stokes ray hereinafter) is generated and is Raman-amplified. The amplified first Stokes ray is enhanced in terms of its power by multiple reflection of the optical resonator composed of the CRRin 201 and the CRRout 203, functions as a pumping light in due course and generates a second Stokes ray with a wavelength of 1240 nm. Third to fifth Stokes rays of the wavelengths of 1310 nm, 1396 nm and 1480 nm are generated sequentially by the similar operation. Here, the reflectivity of the FBG reflecting the light with the wavelength of 1480 nm corresponding to the fifth Stokes ray is low, so that this light with the wavelength of 1480 nm outputs to an outside of the CRRout 203 through the outputting optical fiber 204. It is noted that because the CRRout 203 has the FBG whose reflecting wavelength is 1117 nm, the laser light with the wavelength of 1117 nm outputted out of the CPFL 100 is blocked from outputting to the outside of the CRR 200 and is efficiently utilized within the Raman optical fiber 202.

However, the cascade Raman laser 2000 having the conventional structure has a problem that there is a case when an output of the cascade Raman laser 2000 decreases even if an output of the semiconductor pumping laser of the CPFL 100 is increased to enhance power of output light.

SUMMARY OF THE INVENTION

Accordingly, the present invention seeks to solve the problem described above.

A cascade Raman laser of the invention comprises a pumping laser light source that generates pumping light;

a cascade Raman resonator having an input-side optical reflector that receives the pumping light and selectively reflects light of each wavelength corresponding a n-th Stokes ray (n is an integer more than 1) of Raman scattering to the pumping light, a Raman optical fiber that is connected to the input-side optical reflector and generates Raman scattering light at least by the pumping light and an output-side optical reflector that is connected to the Raman optical fiber and selectively reflects light of each wavelength corresponding to the n-th Stokes ray; and a blocking device interposed between the pumping laser light source and the cascade Raman resonator and blocks the first Stokes ray generated within the cascade Raman resonator from entering the pumping laser light source side.

The structure described above, other objects, features, merits as well as technological and industrial significances of the invention will be more readily understood by reading in conjunction with the following detailed description of the invention and the appended drawings.

These and other objects, features and advantages of the present invention are specifically set forth in or will become apparent from the following detailed descriptions of the invention when read in conjunction with the accompanying drawings.

DETAILED DESCRIPTION OF THE PREFERRED EMBODIMENTS

An embodiment of a cascade Raman laser of the invention will be explained in detail below with reference to FIGS. 1 through 4. It is noted that the invention is not limited to the embodiment described below and may be variously modified without departing from a scope of the invention.

Embodiment

Figure 1:
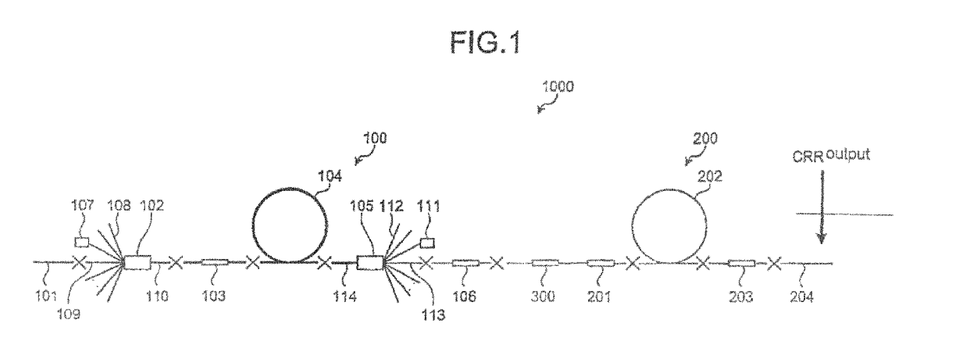
FIG. 1 is a block diagram showing a structure of a cascade Raman laser according to an embodiment of the invention.

FIG. 1 is a block diagram showing a structure of a cascade Raman laser according to the embodiment of the invention. As shown in FIG. 1, the cascade Raman laser 1000 of the present embodiment has a structure in which a CPFL 100 as a pumping laser light source that outputs laser light with a wavelength of 1117 nm as a pumping light and a CRR 200 that generates laser light with a wavelength of 1480 nm by using the laser light with the wavelength of 1117 nm are connected in cascade and in which a blocking device 300 is interposed between the CPFL 100 and the CRR 200.

Firstly, a specific structure of the CPFL 100 will be explained. The CPFL 100 has a structure in which an extension optical fiber 101, a front pumping TFB 102, a HR 103, a CPF 104, a back pumping TFB 105 and an OC 106 are connected in cascade by means of fusion splicing.

The extension optical fiber 101 is composed of an optical fiber called MM125H and its rear end is terminated. The MM125H is covered with coating that has low-refraction index is composed of an single-mode fiber that the clad diameter is 125 µm. The front pumping TFB 102 has a port structure of 19×1. Eighteen pumping optical fibers 108 called LNAP each connected to each of eighteen semiconductor pumping lasers 107 with a wavelength of 915 nm and a center optical fiber 109 in which the MM125H is spliced with an optical fiber called SMT are connected to the nineteen portside of the front pumping TFB 102. The LNAP is multi-mode fiber consist of step index type that the core diameter is 105 µm, the clad diameter is 125 µm, NA is 0.15. An optical fiber 110 called MM200A is connected to the one-port side of the front pumping TFB 102. This MM200A is obtained by low-refractive-index-coating a single-mode optical fiber having a cladding diameter of 200 micrometers, and has a shortened cut-off wavelength such that it operates as a single-mode optical fiber at a wavelength of a 1 micrometer band. The HR 103 is what FBG is written into the MM200A. The CPF 104 is an optical fiber called Yb200 (made by OFS Co.) and its length is 52 m. The back pumping TFB 105 has the same structure with the front pumping TFB 102 and semiconductor pumping lasers 111 are connected one by one to each of eighteen pumping optical fibers 112. It is noted that a center optical fiber 113 on the nineteen port-side of the back pumping TFB 105 is what an optical fiber called SMTLC is spliced with the optical fiber called MM125L. Since this SMTLC is an optical fiber for propagating signal light and designed to be used for signal light having a wavelength of a 1 micrometer band, its cutoff wavelength is shorter than that of SMT. Further, MM125L is obtained by low-refractive-index-coating a single-mode optical fiber having a cladding diameter of 125 micrometers, and has a shortened cutoff wavelength such that it operates as a single-mode optical fiber at a wavelength of a 1 micrometer band. In the case of the back pumping TFB 105, an optical fiber 114 called MM200A on the one port-side is spliced with the CPF 104. The OC 106 is what FBG is written into a Flexcore 1060 (made by Coning Co.).

This CPFL 100 outputs the laser light with the wavelength of 1117 nm by an amplifying action of the CPF 104 when the pumping light is supplied and by an optical resonator composed of the HR 103 and the OC 106.

Next, the CRR 200 will be explained. The CRR 200 has a structure in which a CRRin 201, a Raman optical fiber 202, a CRRout 203 and an outputting optical fiber 204 are connected in cascade by means of fusion splicing.

The Raman optical fiber 202 has high optical nonlinearity and its length is 65 m. The CRRin 201 is composed of five FBGs that selectively reflect lights of mutually different wavelengths. Reflection center wavelengths of the respective FBGs are, from an input side, about 1480 nm, 1390 nm, 1310 nm, 1239 nm and 1175 nm corresponding to wavelengths of first through fifth Stokes rays of Raman scattering to the pumping light with the wavelength of 1117 nm. Meanwhile, the CRRout 203 is composed of six FBGs that selectively reflect lights of mutually different wavelengths. Reflection center wavelengths of the respective FBGs are, from an input side, 1480 nm, 1175 nm, 1239 nm, 1310 nm, 1390 nm and 1117 nm corresponding to wavelengths of first through fifth Stokes rays of Raman scattering to the pumping light with the wavelength of 1117 nm and to the wavelength of the pumping light. The outputting optical fiber 204 is made of the MM125H. It is also noted that reflectivity of the reflection center wavelengths of the respective FBGs of the CRRin 201 and the CRRout 203 is from 5 to 30% for the FBGs whose reflection center wavelength is 1480 nm and is about 100% for the other FGBs.

Next, operations of the CRR 200 will be explained. When the laser light with the wavelength of 1117 nm is inputted to the Raman optical fiber 202 from the CPFL 100, the first Stokes ray with the wavelength of 1175 nm of Raman scattering is generated and is Raman-amplified. The amplified first Stokes ray is enhanced in terms of its power by multiple reflection of the optical resonator composed of the CRRin 201 and the CRRout 203, functions as pumping light in due course and generates the second Stokes ray. Third to fifth Stokes rays are generated sequentially by the similar operation. Here, the reflectivity of the FBG reflecting the light with the wavelength of 1480 nm corresponding to the fifth Stokes ray is low, so that this light with the wavelength of 1480 nm outputs to an outside of the CRRout 203 through the outputting optical fiber 204. It is noted that because the CRRout 203 has the FBG whose reflecting wavelength is 1117 nm, the laser light with the wavelength of 1117 nm outputted out of the CPFL 100 is blocked from outputting to the outside of the CRR 200 and is efficiently utilized within the Raman optical fiber 202.

Here, the reflectivity of the CRRin 201 in the reflection center wavelength of each FBG is not completely 100% in the CRR 200, so that part of the Stokes ray generated within the CRR 200 leaks and propagates to the side of the CPFL 100. However, the blocking device 300 interposed between the CPFL 100 and the CRR 200 blocks at least the light of 1175 nm, i.e., the first Stokes ray, from entering the side of the CPFL 100 in the cascade Raman laser 1000 of the present embodiment. As a result, it becomes possible to prevent the phenomenon that otherwise occurred in the past that an output of the cascade Raman laser decreases when an output of the semiconductor pumping laser of CPFL is increased.

That is, the cascade Raman laser 1000 of the present embodiment permits to obtain the laser light with the wavelength of 1480 nm in high power because the output of the cascade Raman laser 1000 increases in correspondence with an increase of output of the respective semiconductor pumping lasers 107 and 111 of the CPFL 100 by providing the blocking device 300.

Figure 2:
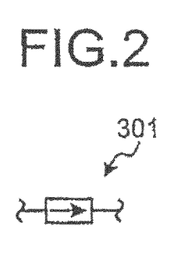
FIG. 2 shows an embodiment of a blocking device.
Figure 3:
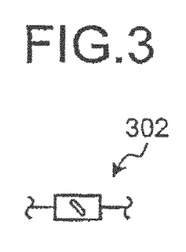
FIG. 3 shows another embodiment of the blocking device.
Figure 4:
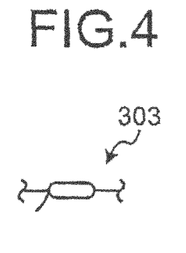
FIG. 4 shows a still other embodiment of the blocking device.

FIGS. 2 through 4 show embodiments of the blocking device 300. An optical isolator 301 shown in FIG. 2 may be used as the blocking device 300. A cutoff filter 302 that selectively cuts off at least the first Stokes ray as shown in FIG. 3 may be also used. The cutoff filter 302 is what uses a dielectric multilayer film filter and an etalon filter for example and may be readily made. Still more, a fiber fused WDM (Wavelength Division Multiplexing) coupler 303 shown in FIG. 4 may be used. It is noted that the fiber fused WDM coupler 303 is preferable because its durability against high power light is high.

The invention will be explained below more specifically. The inventor measured outputs not only from the CRR but also from the back of the CPFL to investigate the cause of decrease of the output caused in the cascade Raman laser having the conventional structure.

Figure 5:
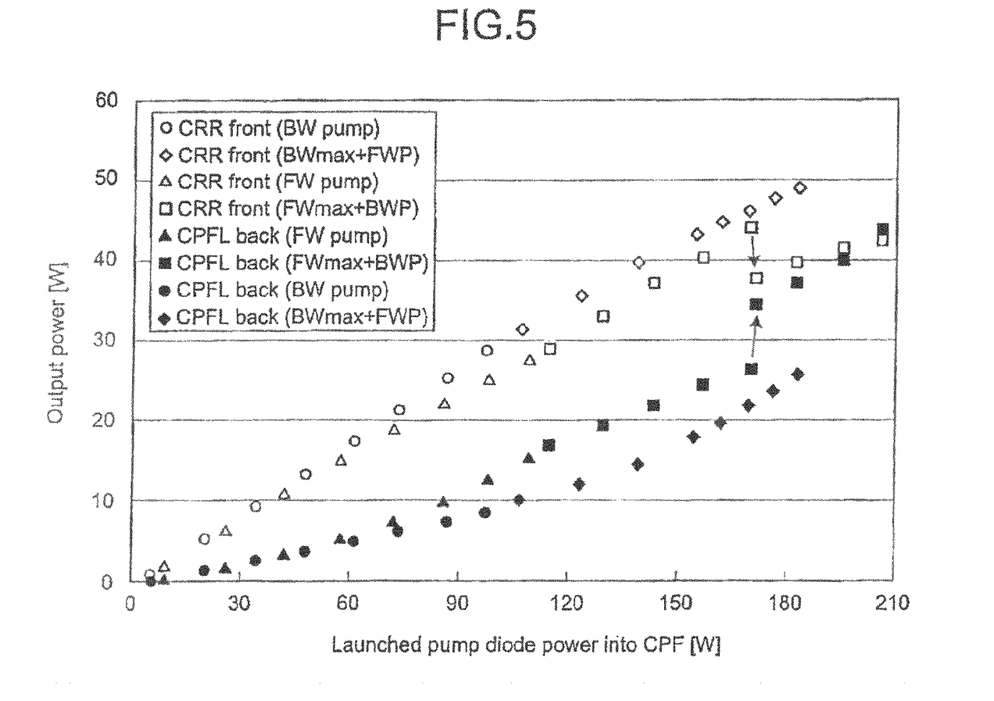
FIG. 5 is a chart showing results of outputs from a back of a CPFL and outputs from a CRR measured while changing power of pumping light in a cascade Raman laser having a conventional structure shown in FIG. 9.

FIG. 5 is a chart showing results of the outputs from the back of the CPFL and the outputs from the CRR measured while changing power of pumping light in the cascade Raman laser having the conventional structure shown in FIG. 9. In FIG. 5, an axis of abscissas denotes a total pumping power inputted to the CPF and an axis of ordinate denotes output power. As for each graph legend, CRR front (BW pump) for example denotes changes of outputs from the CRR when only the pumping power of the back pumping is changed without carrying out the front pumping. Meanwhile, CRR front (BWmax+FWP) for example denotes changes of outputs from the CRR when the pumping power of the front pumping is changed while fixing the pumping power of the back pumping at maximum. Accordingly, data points of the CRR front (BW pump) and those of the CRR front (BWmax+FWP) continue as if a series of data group is formed. Still more, CPFL back (FWmax+BWP) denotes changes of outputs from the back of the CPFL when the pumping power of the back pumping is changed while fixing the pumping power of the front pumping at maximum.

In the case of the CRR front (FWmax+BWP), the output sharply drops as indicated by an arrow in FIG. 5 at position of around 170 W of the total pumping power. Meanwhile, the output sharply increases as indicated by another arrow in the figure at the position of the equal pumping power in the case of the CPFL back (FWmax+BWP) corresponding to the CRR front (FWmax+BWP).

In view of the measuring results shown in FIG. 5, the inventor also measured output spectra of lights outputted out of the back of the CPFL.

Figure 6:
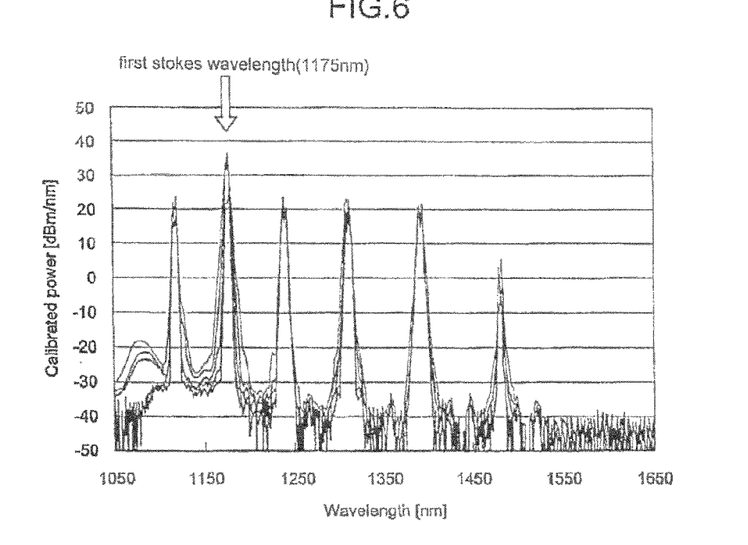
FIG. 6 is a chart showing output spectra of the output lights from the back of the CPFL when a pumping condition of the CPFL is changed.
Figure 7:
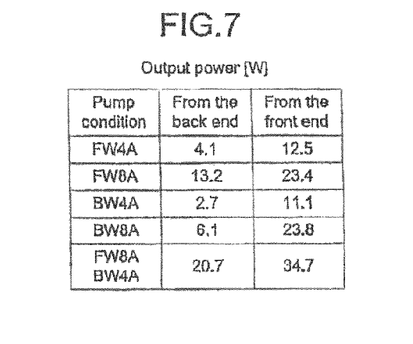
FIG. 7 is a table showing power of output lights from the back of the CPFL and from the CRR when the pumping condition of the CPFL is changed.

FIG. 6 is a chart showing the output spectra of the output lights from the back of the CPFL when a pumping condition of the CPFL is changed and FIG. 7 is a table showing the output power of the lights outputted out of the back of the CPFL and from the CRR when the pumping condition of the CPFL is changed. Note that in FIG. 6, an axis of abscissas denotes wavelengths and an axis of ordinate denotes power calibrated to indicate power per 1 nm of wavelength. As for the pumping condition, FW4A for example indicates a case when an electric current of 4 A is flown only through each semiconductor pumping laser (the semiconductor pumping laser 107 in FIG. 9) on the front pumping end. BW8A for example also indicates a case when an electric current of 8 A is flown only through each semiconductor pumping laser (the semiconductor pumping laser 111 in FIG. 9) on the back pumping end. Still more, FW8A and BW4A indicate cases when an electric current of 8 A is flown through each semiconductor pumping laser on the front pumping end and when an electric current of 4 A is flown only through each semiconductor pumping laser on the back pumping end.

As shown in FIG. 6, the lights outputted out of the back of the CPFL include the first through fifth Stokes rays that are generated in the CRR and could not be cut off by the CRRin. Still more, the optical power intensity of 1175 nm, i.e., the first Stokes ray, is largest in any pumping conditions. When the output power from the back of the CPFL is compared with the output power from the CRR as shown in FIG. 7, although its ratio is about 0.24 under the pumping condition of BW4A, the ratio increases to 0.60 under the pumping condition of FW8A and BW4A. That is, the output light from the back of the CPFL increased.

Figure 8:
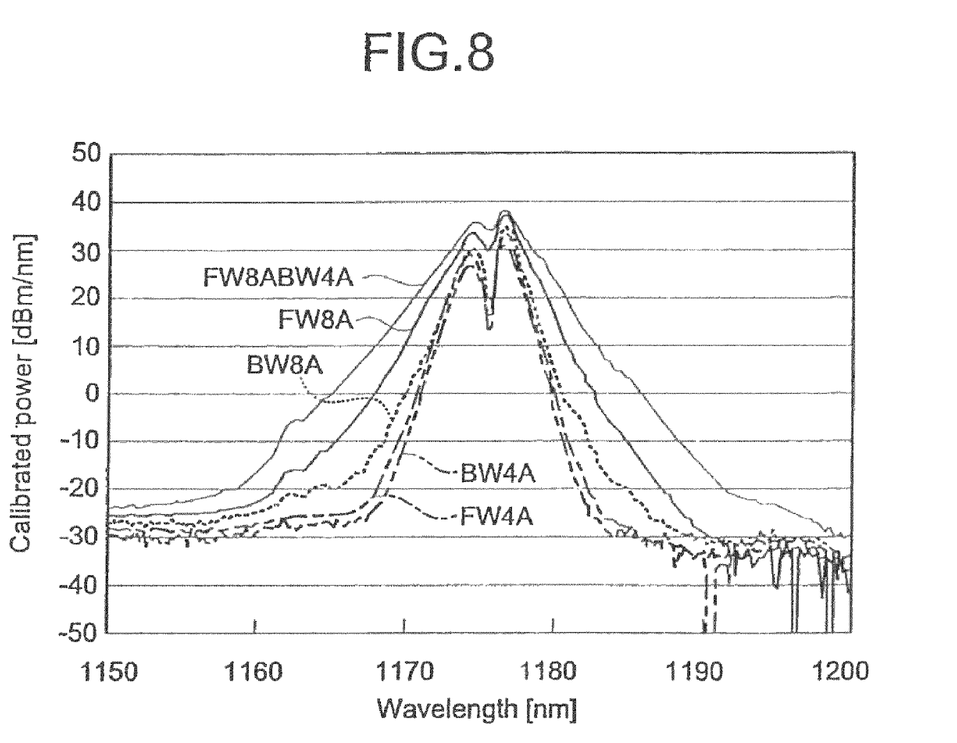
FIG. 8 is an enlarged view in a vicinity of 1175 nm of wavelength of the output spectrum shown in FIG. 6.

The inventor also minutely inspected the first Stokes ray further. FIG. 8 is an enlarged view in the vicinity of the output spectrum with the wavelength of 1175 nm shown in FIG. 6. As shown in FIG. 8, a dent of around 15 dB of depth is formed at a center of a power peak around 1175 nm under the condition of BW4A for example. This dent is considered to be reflecting a shape of reflection spectrum of the FBG contained in the CRRin.

However, this dent becomes shallow to around 5 dB under the condition of FW8A and BW4A. In other words, the power increased relatively by about 10 dB at the center of the power peak.

Such an increase of power is considered to be caused by Raman amplification caused within the CPFL by the light with the wavelength of 1175 nm entered without being cut off by the FBG of the CRRin as light-to-be-amplified and by the light with the wavelength of 1117 nm as pumping light. If the light with the wavelength of 1175 nm is Raman-amplified and is laser-oscillated further as described above, energy of the light with the wavelength of 1117 nm is consumed within the CPFL for the Raman amplification. Thus, the power of the laser light with the wavelength of 1117 nm supplied to the CRR decreases and the output of the cascade Raman laser also sharply decreases.

However, the cascade Raman laser 1000 of the present embodiment has the blocking device 300 that blocks the first Stokes ray generated within the CRR 200 from entering the CPFL 100 between the CPFL 100 and the CRR 200. As a result, it becomes possible to prevent the light-to-be-amplified from entering the CPFL 100 and to prevent the Raman amplification from occurring within the CPFL 100. Accordingly, it is possible to prevent the output of the cascade Raman laser 1000 from decreasing when the output of the respective semiconductor pumping lasers 107 and 111 of the CPFL 100 is increased.

The cascade Raman laser 1000 of the present embodiment may be also arranged so as to decrease a Raman gain factor of the CPF 104. The Raman gain factor of the CPF 104 may be decreased by reducing the optical nonlinearity of the CPF 104 by enlarging its core diameter or by shortening the length of the CPF 104 for example.

Still more, while the blocking device 300 blocks at least the first Stokes ray from entering the CPFL 100 side, it may be one that blocks a higher Stokes ray.

While the cascade Raman laser 1000 utilizes up to the fifth Stokes ray, the invention is also applicable to a cascade Raman laser utilizing the first Stokes ray or a higher Stokes ray.

As described above, the cascade Raman laser of the invention is suitably applied in the field of optical communications and others.

Although the invention has been described by way of the exemplary embodiments, it should be understood that those skilled in the art might readily make further effects and changes. Accordingly, a wider aspect of the invention is not limited by the specific detail and typical embodiments expressed and described above because it may be variously modified without departing from the general spirit and scope of the invention defined by the appended claims and its equivalents.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cascade Raman laser, comprising:
   a pumping laser light source that generates pumping light;
   a cascade Raman resonator having an input-side optical reflector that receives the pumping light and selectively reflects light of each wavelength corresponding to a n-th Stokes ray (n is an integer more than 1) of Raman scattering to the pumping light, a Raman optical fiber that is connected to the input-side optical reflector and generates Raman scattering light at least by the pumping light and an output-side optical reflector that is connected to the Raman optical fiber and selectively reflects light of each wavelength corresponding to the n-th Stokes ray; and
   a blocking device interposed between the pumping laser light source and the cascade Raman resonator and blocks the first Stokes ray generated within the cascade Raman resonator from entering the pumping laser light source side.

2. The cascade Raman laser according to claim 1, wherein the blocking device is an optical isolator.

3. The cascade Raman laser according to claim 1, wherein the blocking device is a cutoff filter that selectively cut off at least the first Stokes ray.

4. The cascade Raman laser according to claim 1, wherein the blocking device is a fiber fused WDM coupler that selectively cut off at the first Stokes ray.

* * * * *